United States Patent
Bratkovski et al.

(10) Patent No.: US 8,258,458 B1
(45) Date of Patent: *Sep. 4, 2012

(54) ELECTROMAGNETIC WAVE RECEIVING ANTENNA

(75) Inventors: Alexandre M. Bratkovski, Mountain View, CA (US); R. Stanley Williams, Portola Valley, CA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1435 days.

This patent is subject to a terminal disclaimer.

(21) Appl. No.: 11/831,291

(22) Filed: Jul. 31, 2007

(51) Int. Cl.
*G01J 1/04* (2006.01)
*H01Q 1/06* (2006.01)
*H01Q 1/36* (2006.01)

(52) U.S. Cl. .............. 250/227.14; 343/721; 343/895

(58) Field of Classification Search .............. 343/720, 343/721, 895; 250/227.14
See application file for complete search history.

(56) References Cited

U.S. PATENT DOCUMENTS

| 6,918,326 B2 * | 7/2005 | Mitsuzono et al. | 82/122 |
| 7,847,236 B2 * | 12/2010 | Bratkovski et al. | 250/237 G |
| 2006/0227422 A1 * | 10/2006 | Monacelli et al. | 359/485 |

OTHER PUBLICATIONS

Tarasov, M.A., et al., "Integr Rec Struct Comprising Compl Spiral Antenna and Tuned Parallel Biased Sis Array", IEEE Trans Appl Supercond, vol. 3, No. 1, Mar. 1993, pp. 2254-2256.
Lezec, H.J., et al., "Beaming Light from a Subwavelength Aperture", Science, vol. 297, Aug. 2, 2002, pp. 820-822.
Barnes, W.L., et al., "Surface plasmon subwavelength optics", Nature, Nature Publishing Group, vol. 424, Aug. 14, 2003, pp. 824-830.
Alda, J., et al., "Optical Antennas for Nano-Photonic Applications", Trends on Nanotechnology, Phantoms Foundations, Segovia, Spain, Sep. 13-17, 2004.
Bilotta, R.M., et al., "Spiral Antennas and Antenna Arrays", IEEE, 2005, pp. 342-345.
Semenov, A., et al., "Integrated Planar Log-Spiral Antenna at Terahertz Waves", IEEE International Workshop on Antenna Technology, 2005, pp. 197-200.
Alda, J., et al., "Micro- and Nano-Antennas for Light Detection", Egypt. J. Solids, vol. 28, No. 1, 2005, pp. 1-13.
Kramer, B.A., "Design and Performance of an Ultrawide-Band Ceramic-Loaded Slot Spiral", IEEE Trans. Antennas Propag., vol. 53, No. 7, Jul. 2005, pp. 2193-2199.
Kramer, B.A., "A Novel Reflective Surface for an UHF Spiral Antenna", IEEE Antennas Wireless Propag. Lett., vol. 5, 2006, pp. 32-34.

* cited by examiner

Primary Examiner — Thanh Luu

(57) ABSTRACT

An electromagnetic wave receiving antenna includes a spiral element configured to selectively attenuate electromagnetic waves having a predetermined wavelength, selected wavelengths, or range of wavelengths, and to concentrate electromagnetic waves having a predetermined wavelength, selected wavelengths, or range of wavelengths other than the attenuated wavelengths.

22 Claims, 3 Drawing Sheets

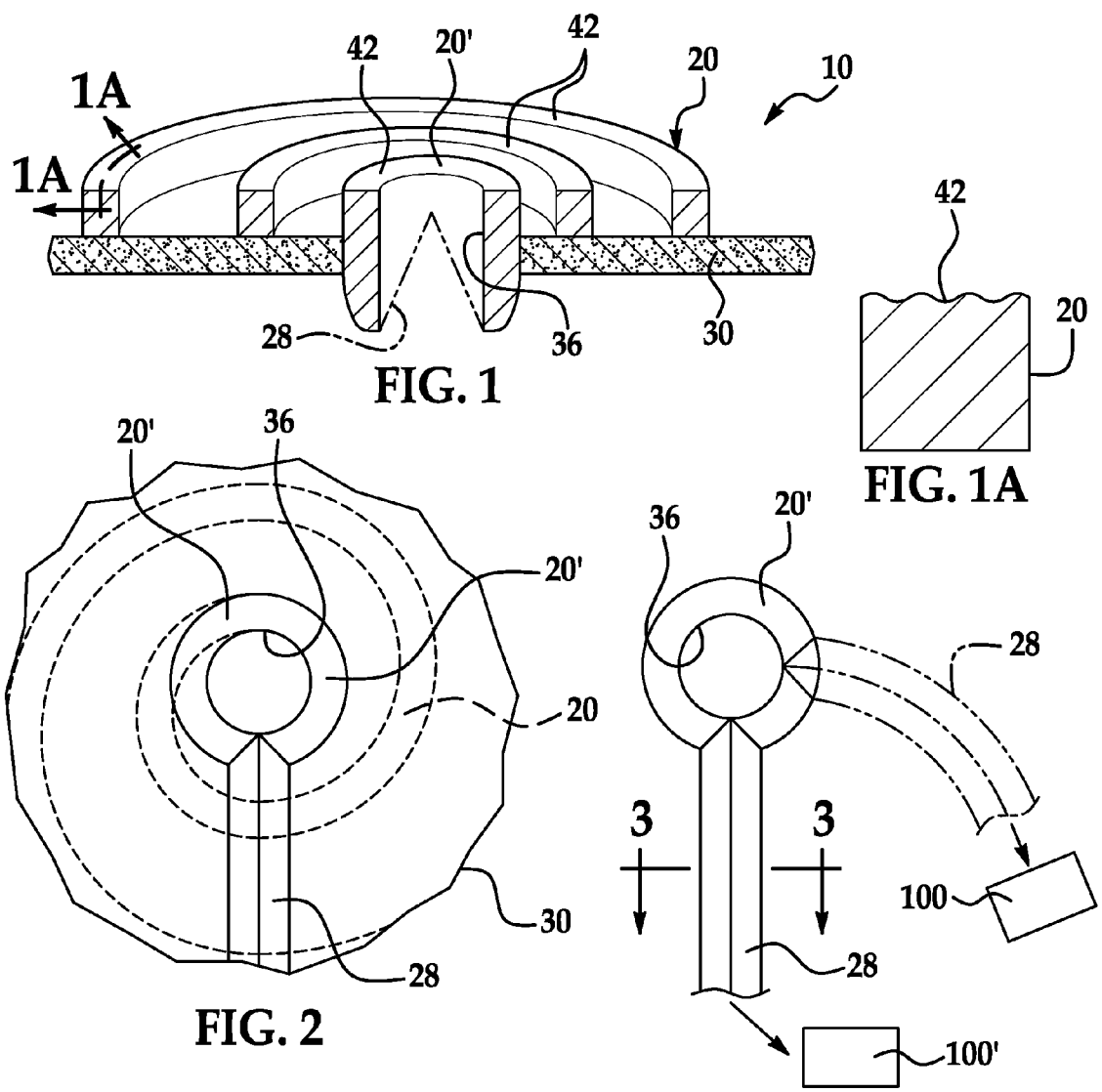
FIG. 1
FIG. 1A
FIG. 2
FIG. 4
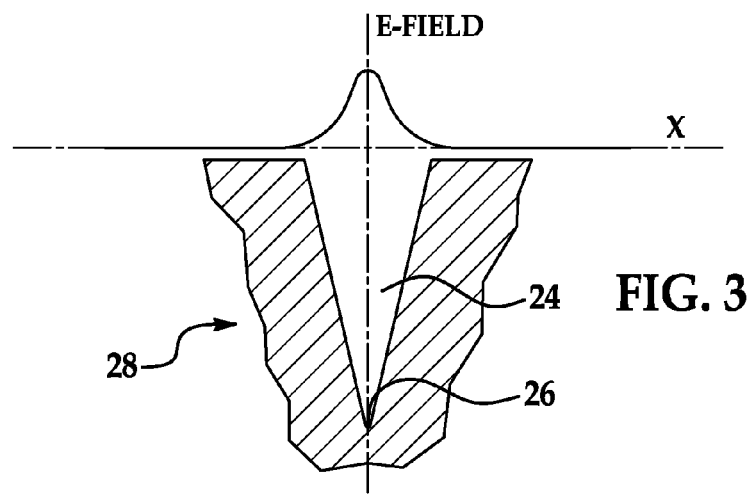
FIG. 3

ELECTROMAGNETIC WAVE RECEIVING ANTENNA

BACKGROUND

The present disclosure relates generally to electromagnetic wave receiving antenna(e) and method(s) for forming the same.

Antennae for receiving light are important in electronic imaging and energy conversion. Electronic imaging involves converting electromagnetic waves to electrical signals, thereby allowing the image to be stored, analyzed, or reproduced electronically. Some current electronic imaging devices are used in, e.g., digital cameras, infrared cameras, microscopes, night vision goggles and document scanners. Energy conversion relates to solar power cells that convert light energy to electrical energy.

Spiral antennae have been used to capture broadband radio signals. Some micro scale spiral antennae have been used as light detectors.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is cross-sectional perspective view of an embodiment of an electromagnetic wave receiving antenna;

FIG. 1A is a cut-away cross-sectional view taken along line 1A-1A of FIG. 1, showing an embodiment of a spiral element exposed surface;

FIG. 2 is a cut-away bottom view of the electromagnetic wave receiving antenna shown in FIG. 1;

FIG. 3 is a cross-sectional view taken along line 3-3 of FIG. 4 showing a plasmonic waveguide;

FIG. 4 is a semi-schematic bottom view of an electromagnetic wave receiving antenna operatively connected to a plasmon waveguide, and showing a second plasmon waveguide in phantom;

DETAILED DESCRIPTION

Figure 5:
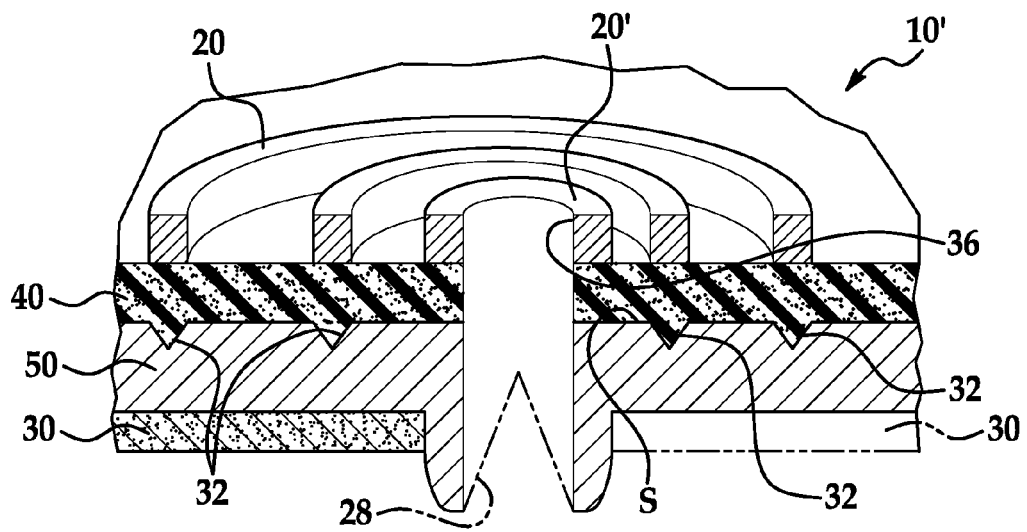
FIG. 5 is a cut-away, cross-sectional perspective view of another embodiment of an electromagnetic wave receiving antenna, including an electromagnetic wave amplifying layer and a metal plasmon collector layer.

Although spiral antennae have been used to capture broadband radio signals, the application of nano scale spiral elements to create a broadband electromagnetic wave harvesting device has not previously been proposed. The present inventors have unexpectedly and fortuitously discovered that nano scale spiral structures may be used to collect wavelengths from broadband incident light and selectively transmit the wavelength(s) of interest to subsequent photonic or electronic devices. As a result, it is contemplated as being within the purview of the present disclosure that nano scale spiral antennae may be used to create arrays in such devices as infra-red (IR), visible (vis) light, or ultra-violet (UV) imaging systems. They may further be used as elements in optical and photonic circuits, for example, connectors, repeaters, or the like.

Embodiment(s) of the electromagnetic wave receiving antenna as disclosed herein advantageously include a spiral element to selectively attenuate electromagnetic waves having a predetermined wavelength, selected wavelengths, or range of wavelengths, and to concentrate electromagnetic waves having a predetermined wavelength, selected wavelengths, or range of wavelengths other than the attenuated wavelengths. As such, the electromagnetic wave receiving antenna/e disclosed herein may generally act to gather/harvest select wavelengths.

It is to be understood that the terms "attenuate/attenuated/attenuating wavelength(s)" as used herein refers to wavelengths that are substantially filtered out of the electromagnetic waves impinging on the spiral antenna/e as disclosed herein. It is to be further understood that the terms "concentrate/concentrated/concentrating wavelength(s)" as used herein refers to wavelengths that are gathered or harvested by the spiral antenna/e as disclosed herein for subsequent use. Yet further, it is to be understood that the intensity of the concentrated wavelengths may increase near the central aperture of the spiral antenna/e.

In an embodiment, the spiral element attenuates and concentrates electromagnetic waves within a band including infra-red light, visible light, ultra-violet light, or combinations thereof. Without being bound to any theory, it is believed that the spiral element will provide broadband wavelength harvesting capability because the spiral has no particular length scale. Furthermore, the spiral antenna/e disclosed herein may be used in a variety of applications, including, but not limited to detecting and/or harvesting electromagnetic waves.

Referring now to FIG. 1, an embodiment of an electromagnetic wave receiving or spiral antenna 10 is depicted. The spiral antenna 10 includes a spiral element 20, with the innermost coil thereof designated 20'. Adjacent coils of element 20 are spaced to selectively concentrate electromagnetic waves having a particular wavelength(s)/range of wavelengths, and to attenuate electromagnetic waves having a wavelength(s)/range of wavelengths other than the attenuated wavelength(s). It is to be understood that the particular wavelength(s)/range of wavelengths may include harmonics of the wavelength(s). In an embodiment, adjacent coils of spiral element 20 are spaced from about 300 nm to about 850 nm apart. In an alternate embodiment, adjacent coils of spiral element 20 are spaced from about 400 nm to about 600 nm apart. The coils are generally spaced apart a distance sufficient to capture the wavelength of interest, e.g., ranging from IR to UV. It is to be understood that the terms "spaced" and "spacing," when referring to adjacent coils of spiral element 20, refer to the "crest to crest" distance between adjacent coils of spiral element 20, i.e. from the center of a radial cross section of one coil of spiral element 20 to the center of a radial cross section of an adjacent coil of spiral element 20.

The spiral element 20 may be formed on a substrate layer 30 (described further below). In an alternate embodiment, the spiral element 20 may be integrally formed with, or may be formed on, a metal plasmon collector layer 50 (shown in FIGS. 6 and 7). Non-limiting examples of suitable metals for the layer 50 include Ag, Au, Al, Rh, Pt, Ni, Cu, etc. In this embodiment, the spiral element 20 is also formed of metal. It is to be understood that the metal used to form the spiral element 20 may be the same or different from the metal used to form the metal plasmon collector layer 50. Generally, in embodiments in which the spiral element 20 is formed integrally with the layer 50, the metals are the same. In embodiments in which the spiral element 20 is established on the layer 50, the metals may be the same or different. As such, any of the previously listed metals may be suitable for forming the spiral element 20.

It is to be understood that, in some instances, the spiral element 20 may be formed from non-metal materials, e.g., heavily doped semiconductors. By "heavily," it is meant doping well over $10^{19}$ cm$^{-3}$, or delta-doped surfaces with doping in excess of $10^{20}$ cm$^{-3}$.

The metal layer 50 and/or the spiral element 20 may be formed via nanoimprint lithography, selective deposition processes, or via non-selective deposition and patterning processes. Examples of suitable deposition techniques include physical vapor deposition, non-limitative examples of which include sputter deposition or evaporation deposition (e.g., thermal or e-beam), chemical vapor deposition (CVD), atomic layer deposition (ALD), inkjet deposition, other suitable printing techniques, and/or spin-coating. In a selective deposition process, a mask or blocking layer may be used to coat any selected surfaces, in order to prevent deposition on such surfaces during deposition of the metal on the remaining unmasked surfaces. In a non-selective deposition process, the metal is deposited on all exposed surfaces. Those surfaces upon which the metal is desirable are then protected by a masking layer, and any remaining unprotected portions of the metal are subsequently removed. Generally, the masking layer is then removed from the protected surfaces, which remain covered with the metal.

In an embodiment, the spiral element 20 or at least a portion of the metal plasmon collector layer 50 is established on a substrate layer 30. The substrate layer 30 may be formed of any suitable dielectric material. It is to be understood that the dielectric material may be an organic dielectric material, an inorganic dielectric material and/or a hybrid mixture of organic and inorganic dielectric materials. A non-limitative example of the organic dielectric material is poly(vinylphenol) (PVP), and non-limitative examples of the inorganic dielectric material are silicon nitride, silicon dioxide, and aluminum oxide (alumina).

As shown in FIG. 1, the innermost coil 20' of spiral element 20 has, or is connected to, a subwavelength aperture/plasmonic collector 36 located substantially at the center of the spiral element 20. The plasmonic collector 36 is electrically or electromagnetically connected to the spiral element 20. In one embodiment, such connection is via the metal plasmon collector layer 50. As shown in FIG. 1, the innermost coil 20' of the spiral element 20 extends through the substrate 30 and substantially surrounds the plasmonic collector/aperture 36. In an example, a metallic spiral element 20, a metallic plasmonic collector 36 and the metal plasmon collector layer 50 may respectively be electrically disconnected from each other, but may be electromagnetically connected, since each of these features supports plasmons.

In an embodiment, the spiral element 20 substantially conforms to a Cornu spiral shape.

It is to be understood that the subwavelength aperture/plasmonic collector 36 has an effective diameter or opening, which may be of any suitable shape and/or configuration. As non-limiting examples, the effective diameter may be substantially round, a slit, or the like. It is to be further understood that the effective diameter may be any suitable size, as desired, and is dependent upon the wavelength for which the antenna is tuned. In one embodiment, the effective diameter is smaller than one half the wavelength of the smallest of a plurality of concentrated electromagnetic wavelengths (where the wavelength is measured in free space, not when converted to plasmons) that is desired to be collected. In a non-limiting example, the aperture/plasmonic collector 36 has an effective diameter ranging from about 150 nm to about 425 nm, and the smallest electromagnetic wavelength to be collected ranges from about 300 nm to about 850 nm.

It is believed that coupling the free-space electromagnetic waves with plasmons allows the electromagnetic waves to be propagated in the form of plasmons, and to be converted back to electromagnetic waves at the aperture/plasmonic collector 36.

In the embodiment shown in FIG. 1, the innermost coil 20' of the spiral element 20 and the plasmonic collector 36 are electrically or electromagnetically connected to a plasmonic waveguide 28. When electromagnetic waves (e.g., light waves) impinge on the spiral element 20, predetermined wavelengths of light interact with the free electrons in the spiral element 20 to create plasmons. In an embodiment, the plasmons propagate from the spiral element 20, through the metal plasmon collector layer 50, and to the plasmonic collector 36. The plasmons may then be radiated back into light, conducted by the plasmonic waveguide 28 for processing by logic elements (not shown), or combinations thereof.

Referring now to FIG. 1A, a surface of the spiral element 20 exposed to incident electromagnetic radiation may include corrugations, surface undulations and/or periodic asperities 42. It is believed that these feature(s) 42 may improve the coupling of the electromagnetic waves and plasmons, and guide them along the respective coils of the spiral element 20 toward the plasmonic collector 36. In some instances, it is believed that this may improve wavelength selectivity when compared to metallic spiral elements without the corrugations, surface undulations and/or periodic asperities 42.

Referring now to FIG. 2, a cut-away bottom view of the spiral antenna 10 of FIG. 1 is depicted. As shown and as previously described, the plasmonic waveguide 28 is electrically or electromagnetically connected to both the innermost coil 20' of spiral element 20 and the plasmonic collector 36. FIG. 3 illustrates a cross-sectional view of the plasmonic waveguide 28 of FIG. 4. As depicted in FIG. 3, the plasmonic waveguide 28 has a notch 24. FIG. 3 also illustrates that the E-field in the plasmonic waveguide 28 is generally strongest at the nadir 26 of the notch 24.

FIG. 4 illustrates multiple plasmonic waveguides 28 electrically or electromagnetically connected to the innermost coil 20' of a spiral antenna 10. As depicted, the plasmonic waveguide(s) 28 may be substantially straight, or may be curved as desired. Furthermore, the waveguides 28 may power various devices 100, 100'. Such devices include, but are not limited to various electronics of an integrated circuit board. As shown in FIG. 4, the devices 100, 100' may be operatively located adjacent an end of the waveguide 28, or at any suitable location. Although two waveguides 28 are shown, it is to be understood that any number of waveguides 28 may be used (within the limits of the particular size/geometry of the innermost coil 20' of the spiral element 20), as desired.

Referring now to FIG. 5, another embodiment of the spiral antenna 10' is depicted. In this embodiment, the nano scale spiral element 20 is formed on/in contact with an electromagnetic wave amplifying layer 40. In an embodiment, the electromagnetic wave amplifying layer 40 is formed from direct gap semiconductor materials with a suitable size gap (e.g., group III-V semiconductor materials (e.g., GaAs, InP, etc.)), glass with erbium doping, or combinations thereof.

As depicted, the electromagnetic wave amplifying layer 40 is established on/in contact with the metal plasmon collector layer 50. As such, in this embodiment, the metal plasmon collector layer 50 is spaced from the spiral element 20. The metal plasmon collector layer 50 may have plasmon collecting grooves or notches 32 formed in a surface S of the metal plasmon collector layer 50 that is adjacent the electromagnetic wave amplifying layer 40. In one embodiment, each notch 32 is formed such that it is substantially aligned with a respective coil of spiral element 20 (as shown in FIG. 5). Such alignment aids in substantially preventing scattering.

The electromagnetic wave amplifying layer 40 may be formed via any of the methods previously described herein for the metal layer 50 and/or for the spiral element 20. In an embodiment, for a communication wavelength where $\lambda=1.55$ µm, the electromagnetic wave amplifying layer 40 may be tailored from an InP/InGaAsP quantum well, via overgrowth of metal on top of it. In a further embodiment, for light within a visible wavelength, the electromagnetic wave amplifying layer 40 may be tailored from a GaAs/AlGaAs quantum well, via overgrowth of metal on top of it. In yet a further embodiment, for light within the blue wavelength, the electromagnetic wave amplifying layer 40 may be tailored from a GaN/AlN quantum well, via overgrowth of metal on top of it. The metal overgrown in each case above may be silver (Ag); however, it is to be understood that any suitable metal may be used, e.g., Au, Al, Rh, Pt, Ni, Cu, etc.

The metal plasmon collector layer 50 may also be established on a dielectric substrate layer 30. In an embodiment, the dielectric substrate layer 30 electrically insulates the metal plasmon collector layer 50 from any potentially undesirable sources or sinks for electrons. However, it is also to be understood that in any of the embodiments disclosed herein, all or a portion of the substrate layer 30 may be removed, for example, via a selective etching process (as shown on the right hand side of FIG. 5). In one embodiment, the dielectric substrate layer 30 may be removed via reactive ion etching. As such, the substrate layer 30 is present in some embodiments of the antenna 10, 10' and is removed in other embodiments.

The dielectric substrate layer 30 may be established by any suitable technique, including, but not limited to plasma enhanced chemical vapor deposition (PECVD), atomic layer deposition (ALD), low temperature chemical vapor deposition, physical vapor deposition sputtering, physical vapor deposition evaporation, and spin on glass.

In the embodiment shown in FIG. 5, electromagnetic waves, such as light, having predetermined wavelength(s)/range(s) of wavelengths impinging on the spiral element 20 are transmitted by the spiral element 20 to the electromagnetic wave amplifying layer 40. In a non-limiting example, a group III-V semiconductor is used as the electromagnetic wave amplifying layer 40. The group III-V semiconductor is electrically pumped and amplifies the light waves, thereby transferring the light waves to the metal plasmon collector layer 50, where the amplified light waves couple with plasmons. In an embodiment, the semiconductor wave amplifying layer 40 includes one or more quantum wells in a heterojunction p-i-n configuration (similar to 1550 nm wavelength semiconductor laser active layers). Electrical contacts are made to the p and n layers, and forward biased to generate gain in the quantum well active layer/semiconductor wave amplifying layer 40.

The plasmonic collector 36 propagates the plasmons to the center of the antenna 10', where they are converted to light, conducted by the plasmonic waveguide 28 for processing by logic elements (not shown), or combinations thereof.

Figure 6:
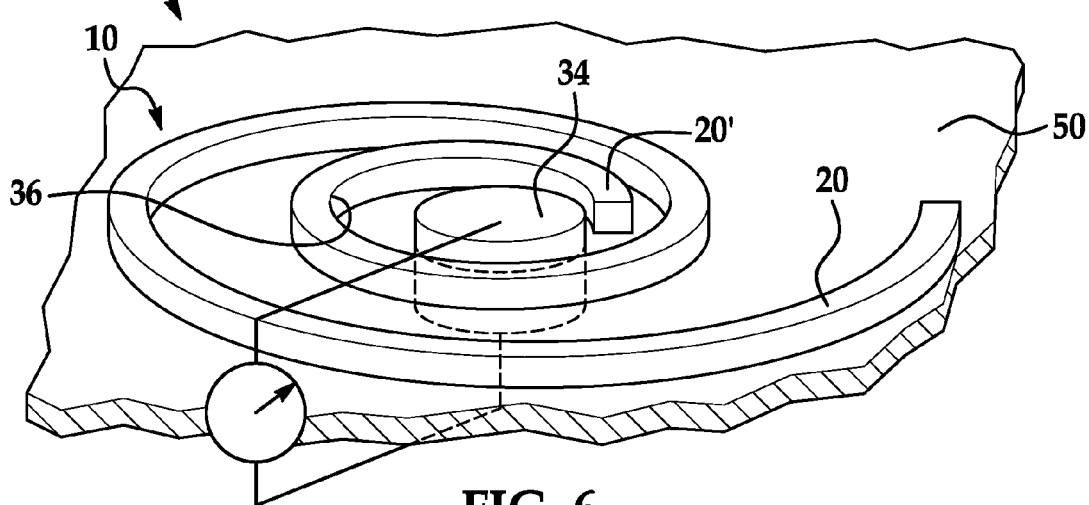
FIG. 6 is a cut-away perspective view of an embodiment of an electromagnetic wave detector system.

In another non-limiting example, glass with erbium doping is used as the electromagnetic wave amplifying layer 40. Light from a laser, diode, or other light source may be used to pump the erbium doped glass amplifying layer 40. In an embodiment, a 980 nm pump wavelength may be pumped from the sides (e.g., edge coupled), or from the top or from the bottom. The layer 40 amplifies the light waves, thereby transferring them to the metal plasmon collector layer 50 where the amplified light waves couple with plasmons. As previously described, the plasmonic collector 36 propagates the plasmons to the center of the antenna 10', where they are converted to light, conducted by the plasmonic waveguide 28 for processing by logic elements (not shown), or combinations thereof. Referring now to FIG. 6, an embodiment of an electromagnetic wave detector system 1000 is depicted. The system 1000 includes an embodiment of the spiral antenna 10, 10' (antenna 10' is not shown in this Figure), and an electromagnetic wave detector 34 established in/in contact with the subwavelength aperture/plasmonic collector 36.

As a non-limiting example, the electromagnetic wave detector 34 is a photo detector, such as a PIN photodiode or an avalanche photodetector.

The coils of the spiral element 20 of the antenna 10, 10' are arranged substantially concentrically about the aperture 36. As previously described, the adjacent coils of the spiral element 20 are spaced so as to selectively attenuate electromagnetic waves having a predetermined wavelength, selected wavelengths, or range of wavelengths, and to concentrate electromagnetic waves having a predetermined wavelength, selected wavelengths, or range of wavelengths other than the attenuated wavelengths. The concentrated wavelengths/range of wavelengths are concentrated to the aperture/plasmonic collector 36 where the electromagnetic wave detector 34 is configured to detect the concentrated electromagnetic waves.

Figure 7:
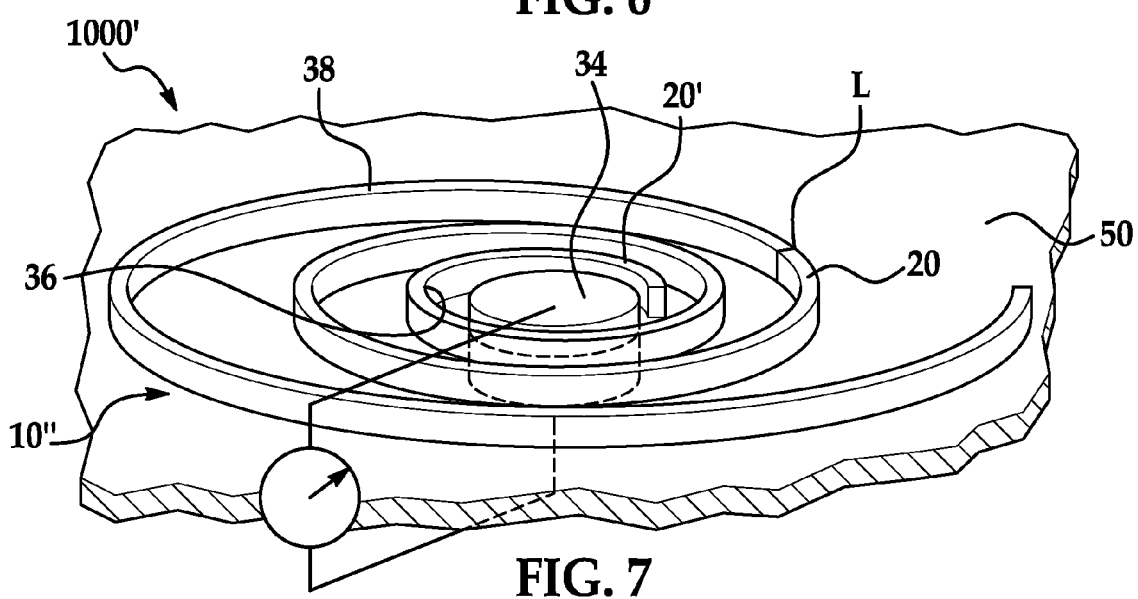
FIG. 7 is a cut-away perspective view of another embodiment of electromagnetic wave detector system including a semiconductor spiral element surrounding a metallic spiral element.

Still another embodiment of the system 1000' is depicted in FIG. 7. This embodiment of the system 1000' includes still another embodiment of the spiral antenna 10". In this embodiment of the antenna 10", a semiconductor spiral element 38 is connected to (designated semi-schematically at line L) the spiral element 20, and is spaced radially from and surrounds inner coil(s) of the spiral element 20. It is to be understood that the other layers 30, 40, 50 and plasmonic collector 36 of the antennae 10, 10' disclosed in reference to FIGS. 1 and 5 may be included in the embodiment of the antenna 10" shown in FIG. 7. It is believed that the semiconductor spiral element 38 amplifies the impinging electromagnetic waves. In an embodiment, the semiconductor spiral element 38 has a diameter that is larger than the largest concentrated electromagnetic wavelength. The semiconductor spiral element 38 may include one or more electromagnetic wave detector(s) 34, e.g., a PIN diode structure, integrated therewith.

In any of the embodiments herein, it is to be understood that the size of the wave detector 34 may be any suitable size sufficient to effectively pick up most or all of the radiation through the aperture 36. In an embodiment, the wave detector 34 is substantially larger than the aperture 36. The electromagnetic wave detector 34, e.g., the PIN diode structure is configured to allow the semiconductor elements 38 to be electrically pumped to amplify the concentrated electromagnetic waves. In an embodiment, the electromagnetic wave detector 34, e.g., a photodiode, may be connected in parallel, similar to nanowire photodiodes that consist of many nanowires connected in parallel, where each acts as a photodiode.

Figure 8:
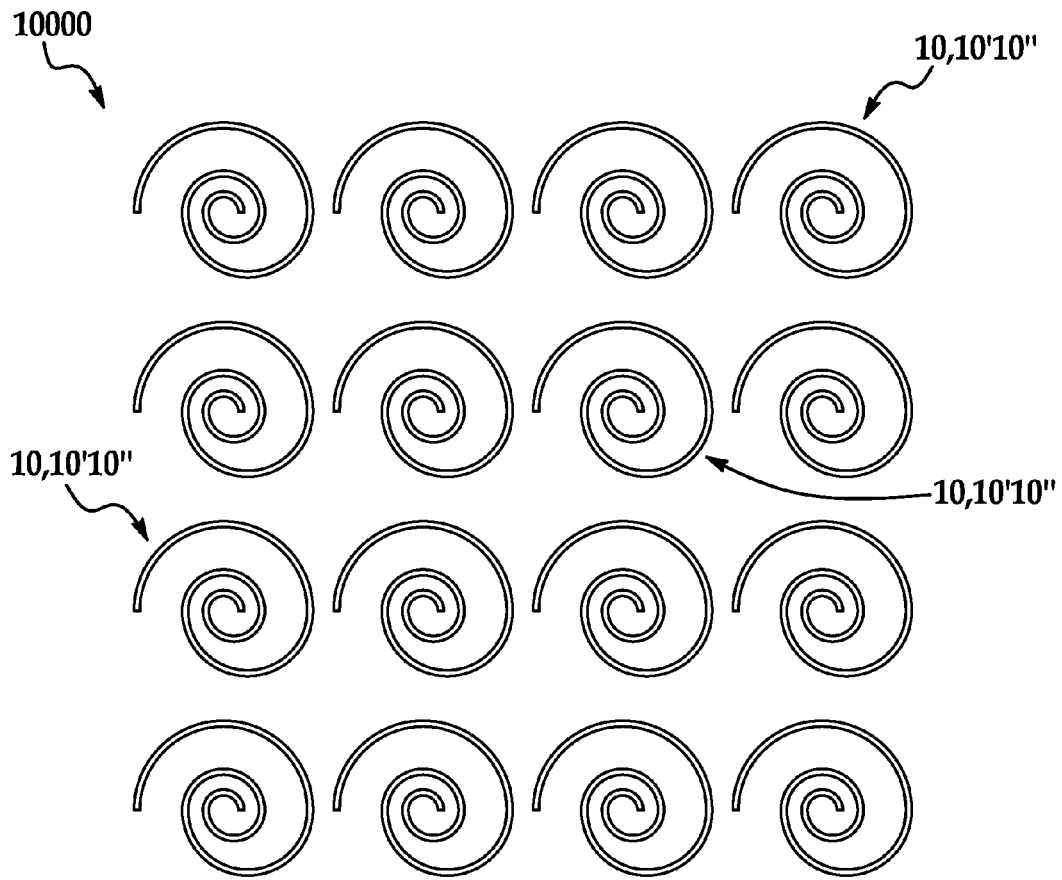
FIG. 8 is a semi-schematic top view of a two-dimensional array of spiral wave receiving antennae.
Figure 9:
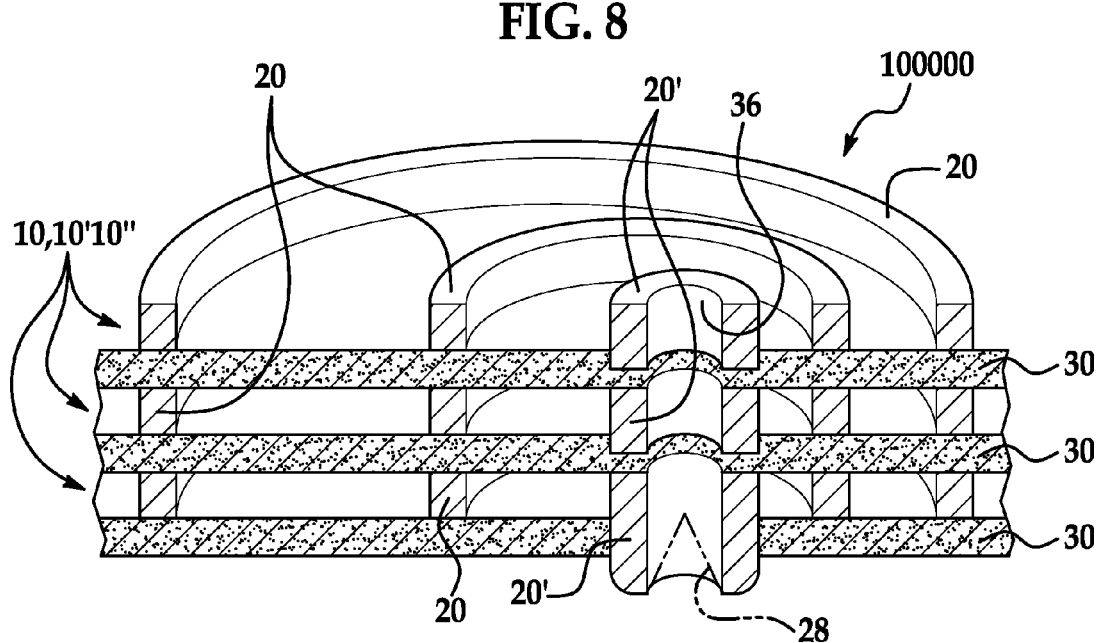
FIG. 9 is a cut-away, cross-sectional perspective view of an embodiment of a stack of spiral wave receiving antennae.

It is to be understood that there may be any number of the spiral antennae 10, 10', 10" disclosed herein; and further, that such antennae 10, 10', 10" may be arranged in a two dimensional array 10,000 (see FIG. 8), a stack 100,000 (see FIG. 9), or in a stack 100,000 of two dimensional arrays 10,000. When the spiral antennae 10, 10', 10" are arranged in a stack 100,000, the concentrated electromagnetic waves output from one antenna 10, 10', 10" are impinged upon another antenna 10, 10', 10" for selection of wavelengths, amplification, attenuation, or other manipulation of the electromagnetic waves. It is believed that including the spiral antennae 10, 10', 10" in a stack 100,000 advantageously increases the gain.

A single spiral antenna 10, 10', 10" is generally tuned to one wavelength λ and higher harmonics (e.g., λ/n, where n=2, 3, 4 . . . ). If it is desirable to collect more than one wavelength, a two dimensional array 10,000 may be used, with the array 10,000 including two or more "different" spiral antennae 10, 10', 10", each patch tuned for a specific λ of interest. Adjacent antennae 10, 10', 10" in an array may be spaced apart (i.e., crest to crest from an outermost coil of the spiral element 20 of one antenna 10, 10', 10" to an outermost coil of the spiral element 20 of an adjacent antenna 10, 10', 10") any suitable distance as desired. Generally, this spacing is similar to spacing between adjacent coils of the spiral element 20 within a single antenna 10, 10', 10", as described above.

In an embodiment of the method for harvesting electromagnetic signals, adjacent coils of the spiral element 20 (including, in an embodiment, adjacent coils of semiconductor spiral element 38), spaced to selectively attenuate electromagnetic waves having a predetermined wavelength, selected wavelengths, or range of wavelengths, and to concentrate electromagnetic waves having a predetermined wavelength, selected wavelengths, or range of wavelengths other than the attenuated wavelengths, is provided. A plasmonic collector 36 is electrically or electromagnetically connected to the spiral element(s) 20, 38, and a plasmonic waveguide 28 is electrically or electromagnetically connected to the plasmonic collector 36. Amplified electromagnetic waves are coupled with plasmonic waves in the spiral element(s) 20, 38; and the plasmonic waves from the plasmonic waveguide 28 may be used as harvested electromagnetic signals.

In another embodiment of the method for harvesting electromagnetic signals, a two-dimensional array 10,000 of antennae 10, 10', 10" is provided. In this embodiment, each antenna 10, 10' includes the metallic spiral element 20. At least one of the antennae 10" also includes a semiconductor spiral element 38 connected to the metallic spiral element 20, as described above. The concentrated electromagnetic waves are amplified via the semiconductor spiral element 38 in the antenna 10".

The amplified electromagnetic waves may then be coupled with plasmonic waves in the metallic spiral elements 20, 20' of another antenna 10, 10', 10" that is different from, or the same as the antenna 10" in which the electromagnetic waves are amplified. In this embodiment, a plasmonic collector 36 is electrically or electromagnetically coupled to the spiral elements 20, 20', and a plasmonic waveguide 28 is electrically or electromagnetically coupled to the plasmonic collector 36 in the other antenna 10, 10', 10". It is to be understood that the geometry of the connection (as well as of any of the connections mentioned herein, including the connection between the metallic spiral element 20 and the semiconductor spiral element 38) is desirably substantially without sharp changes in cross section and/or without other disruptions. The plasmonic waves from the plasmonic waveguides may be used as the harvested electromagnetic signals.

While several embodiments have been described in detail, it will be apparent to those skilled in the art that the disclosed embodiments may be modified. Therefore, the foregoing description is to be considered exemplary rather than limiting.

What is claimed is:

1. An electromagnetic wave receiving antenna, comprising:
   a spiral element configured to selectively attenuate electromagnetic waves having a predetermined wavelength, selected wavelengths, or range of wavelengths, and to concentrate electromagnetic waves having a predetermined wavelength, selected wavelengths, or range of wavelengths other than the attenuated wavelengths,
   wherein the spiral element is formed from a metal or heavily doped semiconductor, and wherein the wave receiving antenna further comprises:
   an electromagnetic wave amplifying layer disposed in contact with the spiral element; and
   a metal plasmon collector layer disposed in contact with the electromagnetic wave amplifying layer and spaced from the spiral element by the electromagnetic wave amplifying layer.

2. The electromagnetic wave receiving antenna as defined in claim 1, wherein the concentrated electromagnetic waves have wavelengths within a band including infra-red light, visible light, ultra-violet light, or combinations thereof.

3. The electromagnetic wave receiving antenna as defined in claim 1, wherein adjacent coils of the spiral element are spaced from about 300 nm to about 850 nm apart.

4. An electromagnetic wave detector system, comprising:
   an electromagnetic wave detector; and
   the electromagnetic wave receiving antenna as defined in claim 1 operatively connected to the electromagnetic wave detector.

5. The electromagnetic wave detector system as defined in claim 4 wherein the electromagnetic wave detector is a photo detector.

6. The electromagnetic wave detector system as defined in claim 5 wherein the photo detector is a PIN photodiode or an avalanche photodetector.

7. The electromagnetic wave detector system as defined in claim 4, further comprising at least one additional electromagnetic wave receiving antenna, wherein the electromagnetic wave receiving antennae are operatively disposed in a stack.

8. The electromagnetic wave receiving antenna as defined in claim 1 wherein the spiral element substantially conforms to a Cornu spiral shape.

9. The electromagnetic wave receiving antenna as defined in claim 1, further comprising a dielectric substrate in contact with the metal plasmon collector layer.

10. The electromagnetic wave receiving antenna as defined in claim 1 wherein the electromagnetic wave amplifying layer is formed from Group III-V semiconductors, glass with erbium doping, or combinations thereof.

11. The electromagnetic wave receiving antenna as defined in claim 1 wherein the metal plasmon collector layer has a metallic surface contacting the wave amplifying layer, and includes plasmon collecting notches formed in the metallic surface, wherein each of the notches is substantially aligned with a respective adjacent coil of the spiral element.

12. The electromagnetic wave receiving antenna as defined in claim 1, further comprising at least one of corrugations, surface undulations or periodic asperities disposed on a surface of the spiral element, wherein the at least one of corrugations, surface undulations or periodic asperities improve formation of surface plasmons and substantially guide the plasmons to a center of the wave receiving antenna.

13. The electromagnetic wave receiving antenna as defined in claim 1, wherein:
the plasmonic collector is electrically or electromagnetically connected to the spiral element; and
at least one plasmonic waveguide is electrically or electromagnetically connected to the plasmonic collector.

14. The electromagnetic wave receiving antenna as defined in claim 13 wherein there is a plurality of concentrated electromagnetic wavelengths, with one wavelength that is smallest, wherein the plasmonic collector is an aperture substantially centered within the spiral element, and wherein the aperture has an effective diameter smaller than one half of the smallest concentrated electromagnetic wavelength.

15. The electromagnetic wave receiving antenna as defined in claim 13 wherein there is a plurality of concentrated electromagnetic wavelengths, with one wavelength that is largest, and wherein the wave receiving antenna further comprises:
at least one semiconductor spiral element spaced radially from the metallic spiral element, wherein the semiconductor spiral element has an originating radius larger than the largest concentrated electromagnetic wavelength; and
at least one PIN diode structure integrated with the at least one semiconductor spiral element, the PIN diode structure configured to allow the at least one semiconductor spiral element to be electrically pumped to amplify the concentrated electromagnetic waves.

16. The electromagnetic wave receiving antenna as defined in claim 1, wherein the spiral element is metallic and is disposed on a dielectric substrate.

17. A two-dimensional array of the electromagnetic wave receiving antennae as defined in claim 1.

18. A method for harvesting electromagnetic signals, comprising:
providing a metallic spiral element with adjacent coils thereof spaced to selectively attenuate electromagnetic waves having a predetermined wavelength, selected wavelengths, or range of wavelengths, and to concentrate electromagnetic waves having a predetermined wavelength, selected wavelengths, or range of wavelengths other than the attenuated wavelengths;
coupling the electromagnetic waves with plasmonic waves in the metallic spiral element;
electrically or electromagnetically connecting a plasmonic collector to the metallic spiral element;
electrically or electromagnetically connecting a plasmonic waveguide to the plasmonic collector; and
using plasmonic waves from the plasmonic waveguide as harvested electromagnetic signals.

19. The method as defined in claim 18, further comprising operatively stacking layers of the metallic spiral elements, thereby increasing gain.

20. The method as defined in claim 18, further comprising:
disposing a semiconductor spiral element spaced radially from the metallic spiral element; and
amplifying the concentrated electromagnetic waves via the semiconductor spiral element.

21. The method as defined in claim 20 wherein there are at least two layers, each of the at least two layers including the metallic spiral element and the semiconductor spiral element, and wherein the method further comprises increasing gain by operatively stacking the at least two layers.

22. A method for harvesting electromagnetic signals, comprising:
providing a two-dimensional array of antenna cells, each antenna cell including a metallic spiral element having adjacent coils spaced to selectively attenuate electromagnetic waves having a predetermined wavelength, selected wavelengths, or range of wavelengths, and to concentrate electromagnetic waves having a predetermined wavelength, selected wavelengths, or range of wavelengths other than the attenuated wavelengths;
disposing a semiconductor spiral elements spaced radially from the metallic spiral element in at least one cell;
amplifying the concentrated electromagnetic waves via the semiconductor spiral element in the at least one cell;
coupling the amplified electromagnetic waves with plasmonic waves in the metallic spiral element in at least one other cell that is the different from, or the same as the at least one cell;
electrically or electromagnetically connecting a plasmonic collector to the metallic spiral element in the at least one other cell;
electrically or electromagnetically connecting a plasmonic waveguide to the plasmonic collector in the at least one other cell; and
using plasmonic waves from the plasmonic waveguides as the harvested electromagnetic signals.

* * * * *